(12) United States Patent
de Queiroz (10) Patent No.: US 6,256,421 B1
(45) Date of Patent: Jul. 3, 2001

(54) METHOD AND APPARATUS FOR SIMULATING JPEG COMPRESSION

(75) Inventor: Ricardo L. de Queiroz, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/207,014

(22) Filed: Dec. 7, 1998

(51) Int. Cl.[7] .................................................. G06K 9/36
(52) U.S. Cl. .......................... 382/239; 382/253; 382/248; 382/232
(58) Field of Search ................................. 382/239, 253, 382/248, 232

(56) References Cited

U.S. PATENT DOCUMENTS

| | | | |
|---|---|---|---|
| 5,341,441 | 8/1994 | Maeda et al. | 382/56 |
| 5,642,438 | 6/1997 | Babkin | 382/250 |
| 5,699,170 | 12/1997 | Yokose et al. | 358/426 |
| 5,699,457 | 12/1997 | Adar et al. | 382/239 |
| 5,745,251 | 4/1998 | Yamagami | 358/426 |
| 5,900,910 | * 5/1999 | Hirabayashi et al. | 348/394 |

OTHER PUBLICATIONS

Vishwanath et al., "An Efficient Algorithm for Hierarchical Compression of Video", IEEE Image Processing, Proceedings, vol. 3, pp. 275–279, 1994.*

* cited by examiner

Primary Examiner—Jose L. Couso
Assistant Examiner—Anh Hong Do
(74) Attorney, Agent, or Firm—Michelle W. Waites; Mark Z. Dudley (57) ABSTRACT

A method and apparatus for efficiently transmitting digital image data is disclosed. More specifically, the present invention accomplishes fast data transmission by analyzing the content of input data, and then retrieving data that closely matches that which would be produced if the data were subjected to some form of data compression from storage. The retrieved data is transmitted to the retrieving device, thereby eliminating the need for very time consuming data compression processes.

17 Claims, 7 Drawing Sheets

METHOD AND APPARATUS FOR SIMULATING JPEG COMPRESSION

The present invention is directed to a method and apparatus for transmitting data without performing conventional data compression. More specifically, the invention accomplishes image compression by analyzing the content of an image and transmitting data that is closely matched to that which would be produced if conventional data compression was allowed to take place.

BACKGROUND OF THE INVENTION

The transmission of electronic data via facsimile machines and similar devices has become quite common. Efforts to transmit significantly larger volumes of this data within a substantially shortened period of time are constantly being made. This is true not only to allow data to be sent from one location to another at faster speeds and to cause less inconvenience to the user, but to enable more complex data to be transmitted between the same locations without drastically increasing the required transmission time. For example the facsimile transmission time for a detailed halftoned image will be many times more than that of a simple sheet of black text on a white page when using the same fax machine. By the same token, fax transmission of a color image will require an even greater amount of time than its greatly detailed halftoned counterpart. It is desirable to be able to transmit documents that contain these types of data—as well as others—within a short period of time.

Without any form of data reduction, transmission of color image data files via facsimile would require extensive resources—very fast modems and/or large buffers—and would still take a great deal of time. This would cause transmission of these large data files to become very expensive and therefore, impractical. Instead, the transmission of color image data via fax is typically accomplished using some form of data compression prior to transmission.

The JPEG (Joint Photographic Experts Group) standard provides a well known method of compressing electronic data. JPEG uses the discrete cosine transform (DCT) to map space data into spatial frequency domain data. Simply put, the first step in JPEG compression is to transform an 8×8 block of pixels into a set of 8×8 coefficients using the DCT. The DCT with the lowest frequency is referred to as the DC coefficient (DCC), and the remaining coefficients are AC coefficients (ACCs). The DCC and ACCs are quantized—divided by an integer referred to as the "step size" and rounded to the nearest whole number. The losses that occur during JPEG compression typically occur during the quantization step. The magnitude of this loss is obviously dependent upon the step size selected and the resulting amount of roundoff required to perform quantization.

Next, the quantized coefficients are arranged in a one dimensional vector by following a selected path (i.e. zigzag) through the 8×8 block of quantized coefficients. The DCC is typically the first value in the vector. Ordinary JPEG compression typically includes replacing the quantized DCC with the difference of its actual value minus the DCC of the previous block, to provide a differential DCC. Finally, the vector is encoded into a bit stream through a sequence of Run Length Counting (RLC) operations, combined with Variable Length Codes (VLC) to produce a compressed data stream.

Fax transmission of color image data is often accomplished by scanning the image at the sending fax to generate digital color image data, subjecting this digital color image data to JPEG compression and then transmitting the compressed digital color image data over telephone lines to the receiving fax. Since color image data is so complex, high compression ratios must usually be applied in order to complete transmission of a JPEG compressed file within an acceptable time frame. High compression ratios lead to more data loss, typically at the higher end of the frequency range. Further, the imaging devices typically included with fax machines in the lower end of the market usually include thermal ink-jet printers and would likely use error diffusion halftoning techniques. The halftoning that occurs when using a thermal ink jet printer results in an additional loss of high frequency data. Thus, much of the detail in the original image that is preserved and transmitted will never actually be viewed by the ultimate user.

The "sending" portion of fax transmission includes scanning the original image, generating a corresponding digital image, and reducing the data using any one of a number of techniques, one of which is JPEG compression described above. Once these steps are completed, the compressed data is transmitted serially to the receiving fax in a bit stream. The length of the bit stream used to describe the image is inversely proportional to the amount of compression that has been applied. Thus, if the compression ratio is large the length of the bit stream used to describe the image will be very short, resulting in a substantial reduction in the transmission time for the data stream.

With this in mind, successful fax transmission requires a proper correspondence between the compression ratio being applied to the image and the clock speed of CPU of the sending fax. In other words, if the compression ratio is smaller than necessary for a given CPU speed the data will have to wait to be transmitted, and an appropriately sized buffer will be required. On the other hand, if the compression ratio is high relative to the CPU speed the data will be compressed so much that the modem will become idle waiting for the CPU to complete image processing for the few bits that remain after compression. Since modems are typically configured to detect a large lapse in data transmission as the end of transmission, this large gap typically causes them to disconnect.

Thus, it is advantageous to continue the stream of data from the sending fax to the receiving fax, and eliminate gaps in the data stream. One way to do this is obviously to implement a faster JPEG compressor which can keep the data moving through the modem even if a high compression ratio is used. However, this solution results in significant cost increases and is often impractical. Thus, it is advantageous to provide a continuous stream of data during transmission of a color facsimile by transmitting stored data that emulates that produced by JPEG compression. This eliminates the need for actually performing JPEG compression, which as indicated above, can be a relatively time consuming task when large volumes of data are being processed.

In the present invention, blocks of data similar to those which would be produced by JPEG are stored in advance. The scanned image is then analyzed to assess its content, and the blocks that are similar to those that would be produced during JPEG compression of the image being processed are identified. The identified blocks are then retrieved from storage and transmitted to the receiving device instead of actual JPEG compressed original data. This means that full JPEG compression will not have to take place, and the amount of image processing time can be dramatically reduced.

All pixels, and therefore blocks of pixels, are defined using a certain number of bits. In an image processing operation known as vector quantization (VQ), a block of X×Y pixels is mapped to a single "codeword" which is defined using a smaller number of bits than the number required by the original block. Hierarchical Vector Quantization (HVQ) is used in the present invention to analyze the scanned image and select the most closely matching data block. HVQ block matching searches are performed two samples at a time. Thus, look up tables (LUTs) can be used directly to perform HVQ in two or more levels. In the first level, two image pixels are mapped to one codeword, reducing the number of samples by a factor of 2. In the next level, the process is repeated to map pairs of codewords to single codewords. As the process continues, the resulting codewords are mapped to larger and larger amounts of data. The codeword to which each pixel block is ultimately mapped is that associated with image data that most closely matches the image data in the original block of pixels.

The following disclosures may be relevant to aspects of the present invention:

U.S. Pat. No. 5,745,251 to Yamagami issued Apr. 28, 1998 relates to a video signal recording apparatus for recording a video signal in such a manner that the video signal is compressed before it is recorded. The apparatus includes a first coding device for coding input image data into code data having a variable length; a second coding device for coding code data having the variable length and coded by the first coding device into code data having a fixed length; and a memory for storing code data coded by the first coding device.

U.S. Pat. No. 5,699,457 to Adar et al. issued Dec. 16, 1997 discloses a method of bit rate control and block allocation for discrete cosine transform (DCT) image signal compression includes the steps of (a) partitioning the image signals in blocks representing portions of the total image, (b) calculating DCT coefficients for image data in all blocks, (c) obtaining a measure of block activity (BACT) for each block based on DCT coefficients and for the total image activity (ACT) as a sum of the measures of all block activity, and (d) determining a code allocation factor (AF) for each block based on the ratio of block activity (BACT) to target code volume (TCV data) for the coded image data. The method also includes (e) allocating bits for each block using the allocation factor (AF) for each block and the target code volume (DCV data).

U.S. Pat. No. 5,699,170 to Yokose et al. issued Dec. 16, 1997 discloses an image communication system wherein transmission of an image between an image transmission apparatus and an image reception apparatus which include image output sections having different performances can be performed without making an inquiry for the performance prior to transmission. An image is inputted by an image input section and sent to a hierarchization section in the image transmission apparatus. The hierarchization section converts the inputted image into hierarchic communication data and transmits hierarchized data to a selection section of the image reception apparatus. The selection section extracts only necessary data from the hierarchic communication data transmitted thereto in accordance with the performance of an image output section of the image reception section and then sends the necessary data to the image output section after, if necessary, they are converted into image data. The image output section visualize the image data transmitted thereto from the selection section.

U.S. Pat. No. 5,642,438 to Babkin issued Jun. 24, 1997 discloses image compression implementing a fast two-dimensional discrete cosine transform. More specifically, Babkin discloses a method and apparatus for the realization of two-dimensional discrete cosine transform (DCT) for an 8×8 image fragment with three levels of approximation of DCT coefficients.

U.S. Pat. No. 5,341,441 to Maeda et al. issued Aug. 23, 1994 discloses method and apparatus for coding image information, and a method of creating code books. A coding apparatus divides digital image information into pixel blocks each having a size of M×N pixels, and subjects the image information to vector quantization in block units. The pixel blocks are orthogonally transformed and the characteristics and sequency components of the pixel blocks are detected. Each pixel block is divided into a plurality of sub-blocks in conformity with the detected sequency components. Respective ones of the plurality of divided and outputted sub-blocks are scalar-quantized into sub-vectors of a predetermined number of bits in conformity with the characteristics of the pixel blocks. Respective ones of the scalar-quantized values of the quantized sub-blocks are vector-quantized in conformity with the characteristics of the pixel blocks, these vector-quantized reproduction vector codes are combined and the result is subjected to further vector quantization.

Pending U.S. Ser. No. 09/075935 filed on May 12, 1998 by Ricardo L. DeQueiroz and assigned to the assignee of the present invention discloses an encoding and/or decoding method and apparatus which incorporates decoding commands into a compressed file. The decoding commands are instructions carried along to a decompressor and implement processing performed in the compressed domain. Then, the decompressor processes the data while decompressing it. This reduces the computation time for imaging operations.

Pending U.S. Ser. No. 09/119023 filed on Jul. 20, 1998 by Ricardo L. DeQueiroz entitled Improved Method of Compressing JPEG Files and assigned to the assignee of the present application discloses a method and apparatus for compressing digital image data to improve the efficiency of serial data transmission. The invention accomplishes image compression by performing the most complex portions of a standard compression technique on a smaller amount of data than the usual 8×8 block of image data. The invention includes a fast JPEG compressor based on a modified two-dimensional discrete cosine transform.

Pending patent application by Ricardo L. DeQueiroz entitled Method and Apparatus for Analyzing Image Data to Use Multiple Transforms for Enhanced Image Data Transmission and assigned to the assignee of the present invention discloses a method and apparatus for compressing digital image data to improve the efficiency of serial data transmission is disclosed. More specifically, the present invention accomplishes image transmission by providing multiple image processing modules, and then selecting the module that will process the entire in the most efficient manner, based upon the content of the data contained in the image. Image content is analyzed using hierarchical vector quantization.

Pennebaker and Mitchel, "JPEG: Still Image Compression Standard" published by Van Nostrand-Reinhold, 1993 describes in detail the operation of the JPEG standard algorithm for compression of images.

Gersho and Gray, "Vector Quantization and Signal Compression" published by Kluwer Academic, 1992 describes in detail forms of operation of systems based on vector quantization for image compression.

Viswanath and Chou, "An Efficient Algorithm for Hierarchical Compression of Video", in the Proceedings of IEEE International Conference on Image Processing, 1995, pages 275–279, describes the method of hierarchical vector quantization for the compression of image and video.

All of the references cited herein are incorporated by reference for their teachings.

Accordingly, although known apparatus and processes are suitable for their intended purposes, a need remains for . . . thereby improving the efficiency of serial data transmission.

SUMMARY OF THE INVENTION

In accordance with one aspect of the invention there is provided a method of improving the speed and efficiency of electronic data compression, which includes: obtaining an input image data block which includes discrete values that represent light intensity in an image; analyzing a content of the input image data block and mapping the image data block to a single codeword using at least one look up table; retrieving stored output image data that will closely match that which would be produced by compressing the input image data; and transmitting the retrieved output data to a receiving device.

In accordance with another aspect of the invention there is provided a method of improving the speed and efficiency of electronic data compression, which includes: obtaining an input image data block which includes discrete values that represent light intensity in an image; computing an average signal value for the data block; forming a difference block with signal values that equal a difference between signal values of the input data block and the computed average signal value; analyzing a content of the difference block and mapping the difference block to a single codeword using at least one look up table; retrieving stored output image data that will closely match that which would be produced by compressing the difference data block; encoding the computed average signal value; and transmitting the encoded computed average signal value and the retrieved output data to a receiving device.

In accordance with another aspect of the invention there is provided an apparatus for transmitting a reproduction of an original image from a sending location to a receiving location, including: a scanner which acquires the original image and which digitizes light that is reflected from the original image to form input digital image data that includes pixel values which represent the light intensity throughout the original image; a central processing unit which includes a segmenter which separates the input data into a plurality of input data blocks; an image analyzer which analyzes the content of an input data block, and maps the input data block to a single codeword; a memory with output data blocks stored therein; a retriever which selects an output data block based upon the input image data block content, and transfers the output data block from a memory to the central processing unit; and a transmitter which sends the retrieved output data block to a receiving device.

In accordance with yet another aspect of the invention there is provided an apparatus for improving the speed and efficiency of electronic data compression, that includes: means for obtaining an input image data block which includes discrete values that represent light intensity in an image; means for analyzing a content of the input image data block and mapping the image data block to a single codeword using at least one look up table; means for retrieving stored output image data that will closely match that which would be produced by compressing the input image data; and means for transmitting the retrieved output data over telephone lines to a receiving device.

The present invention deals with a common problem in digital image processing systems—obtaining an effective yet cost efficient way to supply a continuous stream of complex image data from a sending fax to a receiving fax. One way to solve this problem includes transmitting blocks of data that are similar to those that would be produced by ordinary JPEG compression, rather than actually completing the full JPEG compression process.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for compressing complex digital image data to enhance the efficiency of data transmission.

Figure 1:
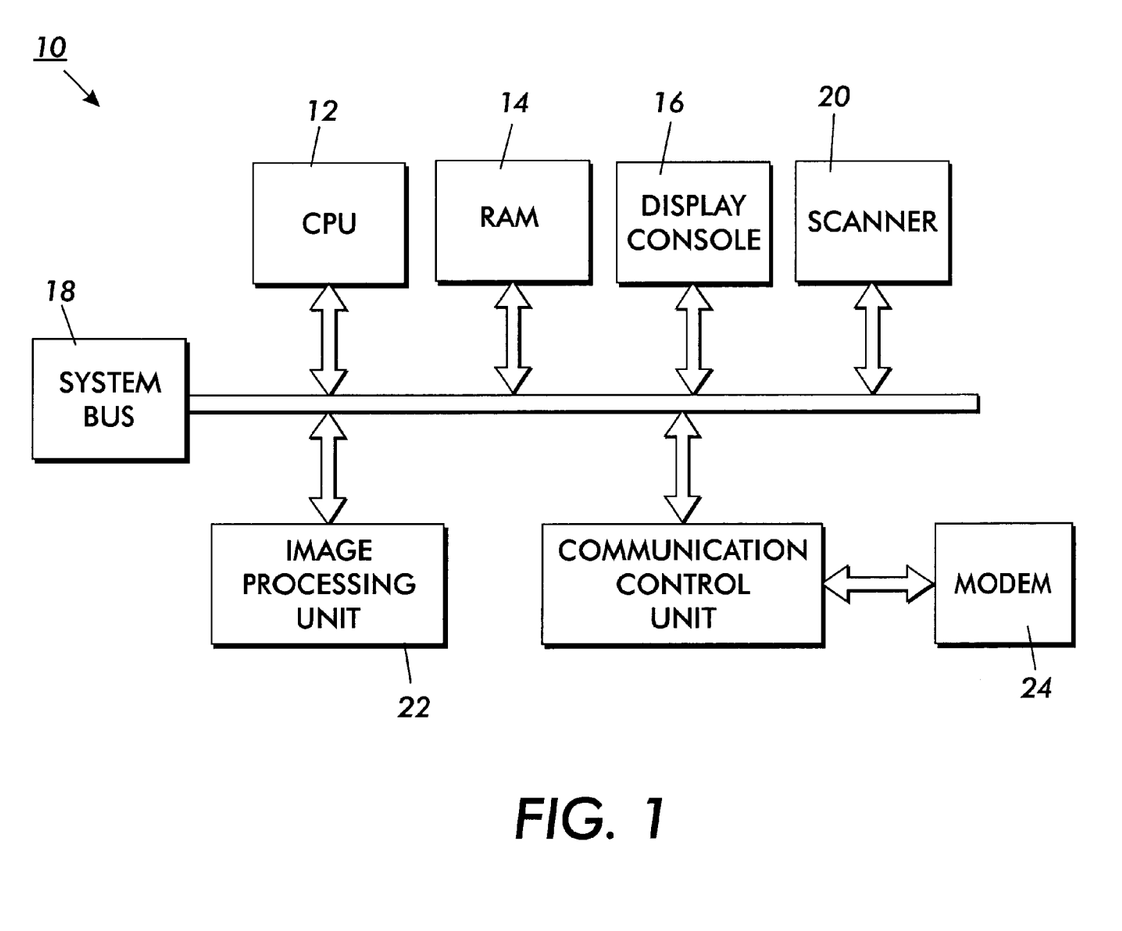
FIG. 1 is a generalized block diagram illustrating general aspects of a facsimile machine that may be used to practice the present invention.

Referring now to the drawings where the showings are for the purpose of describing an embodiment of the invention and not for limiting same, FIG. 1 is a block diagram showing structure of an embodiment of a facsimile (fax) apparatus 10 according to the present invention. Fax 10 includes a CPU 12 for executing controlling processes and facsimile transmission control procedures, a RAM 14 for controlling programs and a display console 16 with various buttons and/or switches for controlling the facsimile apparatus and LCDs or LEDs for reviewing the status of system operation. A scanner 20 is also included for acquiring an original image and generating image data therefrom. Image processing unit 22 is included to perform encoding and decoding (compression and decompression) processes between an image signal and transmitted codes. Significantly for purposes of this invention, fax 10 includes or interfaces with a modem 24, which is a modulating and demodulating device that transmits and receives picture information over telephone lines to a compatible receiving device 26, such as another facsimile machine, a printer, computer terminal or similar apparatus.

As stated above, image processing unit 22 is used to compress and decompress image signals and transmitted codes. One common method of compressing and decompressing image signals is through use of the JPEG (Joint Photographic Experts Group) standard described in detail within the incorporated references. However, many forms of compression are available and the invention is not limited to this embodiment. As indicated above, an original document is acquired by a scanner 20, which digitizes light that is reflected from the image to form digital image data. Digital image data comes in the form of picture elements or "pixels" which indicate the intensity of the light that is measured at discrete intervals throughout the surface of the page.

Figure 2:
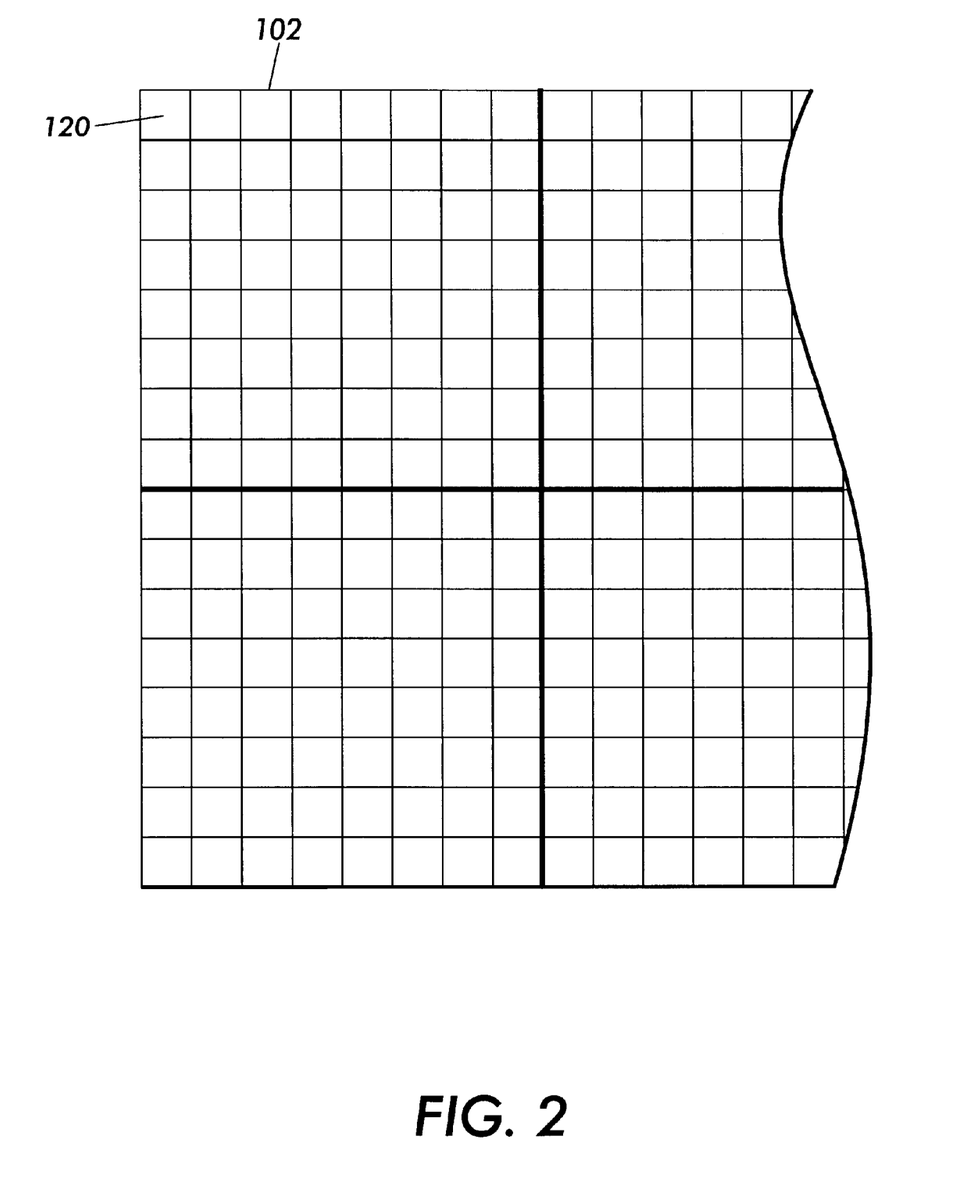
FIG. 2 contains a diagram that illustrates how digital image data is grouped into blocks according to the present invention.

With reference to FIG. 2, pixels 120 emit light signals with values that indicate the color or, in the case of gray scale documents, how light or dark the image is at that location. As those skilled in the art will appreciate, most pixels 120 have values that are taken from a set of discrete, nonnegative integers. For example, in a color document, individual separations are often represented as digital values in the range 0 to 255, where 0 represents no colorant (i.e. when CMYK separations are used), or the lowest value in the range when luminance-chrominance separations are used. Consequently 255 represents the maximum amount of colorant (for CMYK) or the highest value in the range (i. e. maximum light/white, red and yellow respectively for L*a*b*). In a gray-scale pixel map this typically translates to pixel values which range from 0, for black, to 255, for the whitest tone possible.

In one embodiment of the invention, pixels 120 which represent the entire set of digital image data are separated into blocks 102. In the preferred embodiment block 102 will be configured with eight pixels extending in the horizontal direction and eight pixels extending in the vertical direction, and the invention may be used with JPEG compression. However, other block configurations are possible and compatibility with JPEG compression is not an absolute necessity. Those skilled in the art will recognize that a smaller or larger block size might be chosen when it is desired to preserve more or less image detail. In fact it should be noted that while the horizontal and vertical dimensions are identical in the embodiment of input block 102 described here, this is not a requirement for practicing the present invention. For example, a non-square block might be chosen if the image was generated for a device possessing asymmetric resolutions in the vertical and horizontal directions.

As stated earlier, compressing large volumes of data can be a very time consuming task. The present invention substantially reduces the amount of time required to process and transmit a digital image without actually compressing the data, while retaining image quality.

In Vector Quantization (VQ), an image processing operation well known in the art, K symbols that have N bits each are assigned to a single B bit codeword, where B<NK. For example sixteen eight-bit input strings might be assigned to a twelve-bit codeword. Thus, in this example, there will be enough codewords to represent only the 4096 ($2^{12}$) most representative blocks of the sixteen input symbols. Considering that goal is to represent entire images, it is easy to see that the number of bits used to represent an entire image using codewords is substantially less than the number that would be required to represent the image using the original blocks. Codewords that are produced by vector coding can be stored or transmitted to another location or device, and later decoded—mapped back—to K symbols.

Figure 3:
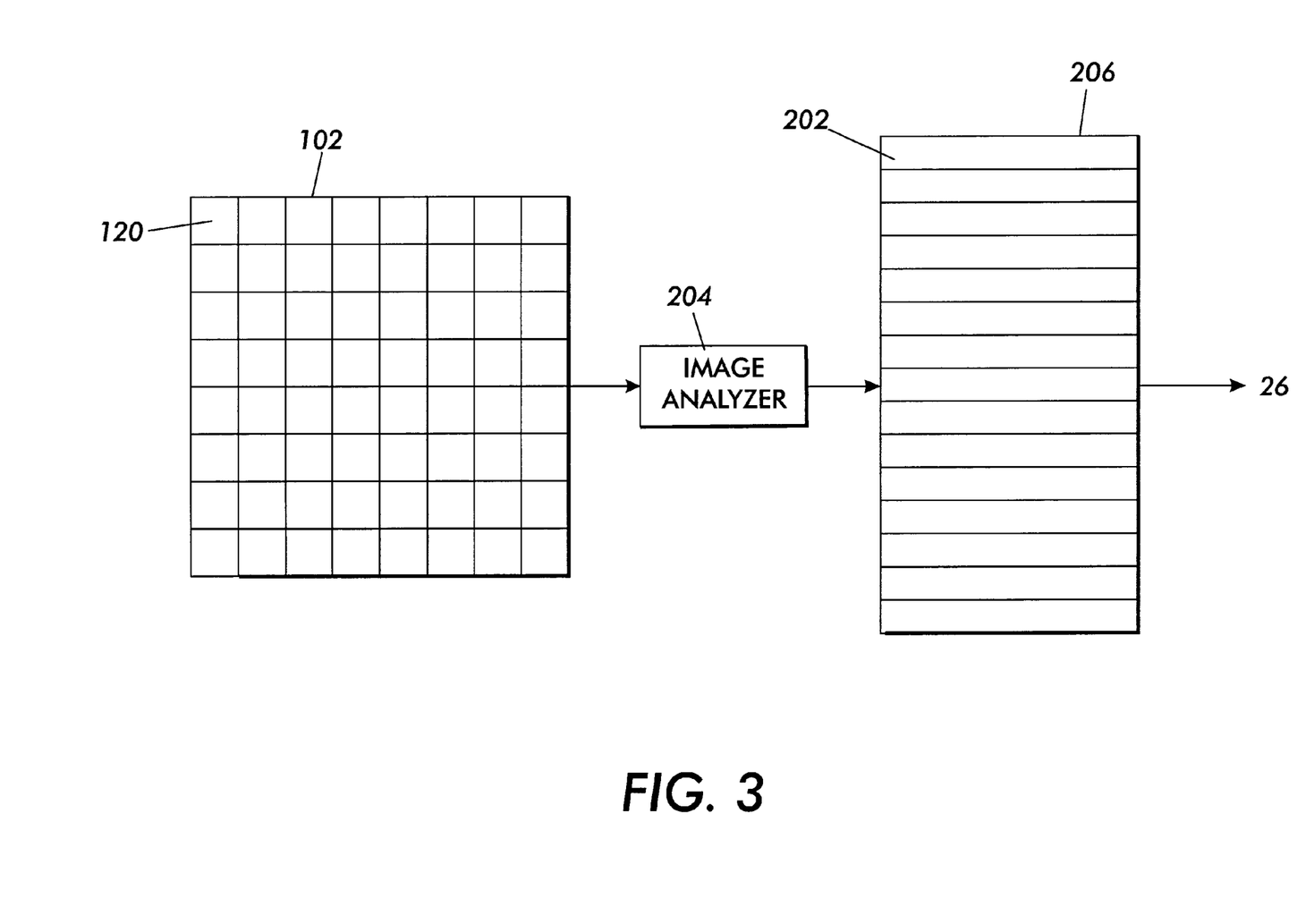
FIG. 3 is a generalized diagram depicting one embodiment of the present invention.

Turning now to FIG. 3, in the present invention output image data blocks 202 are stored in memory 206 in each facsimile or other transmitting device 10. The invention includes an image analyzer 204, which analyzes the content of the input block 102 and then retrieves from storage, an output block 202 that will closely simulate the data that would have been produced by the selected compression method had it been allowed to take place. In the preferred embodiment of the invention, JPEG will be the selected compression method. But again, the invention is not limited to JPEG compression and numerous other forms compression may be implemented as well. Specifically, the present invention uses Hierarchical Vector Quantization (HVQ) to analyze the activity of each input block 102 in the scanned image. Once the input block 102 is analyzed, the proper output block 202 is selected, retrieved from memory 206, and transmitted to receiving device 26 for output. Codewords, codebooks and the entire mapping process are prepared in advance of operating the present invention. Thus, the only calculations that are required during operation are to compare input data blocks 102 to the codebook and select the appropriate codeword.

Figure 4:
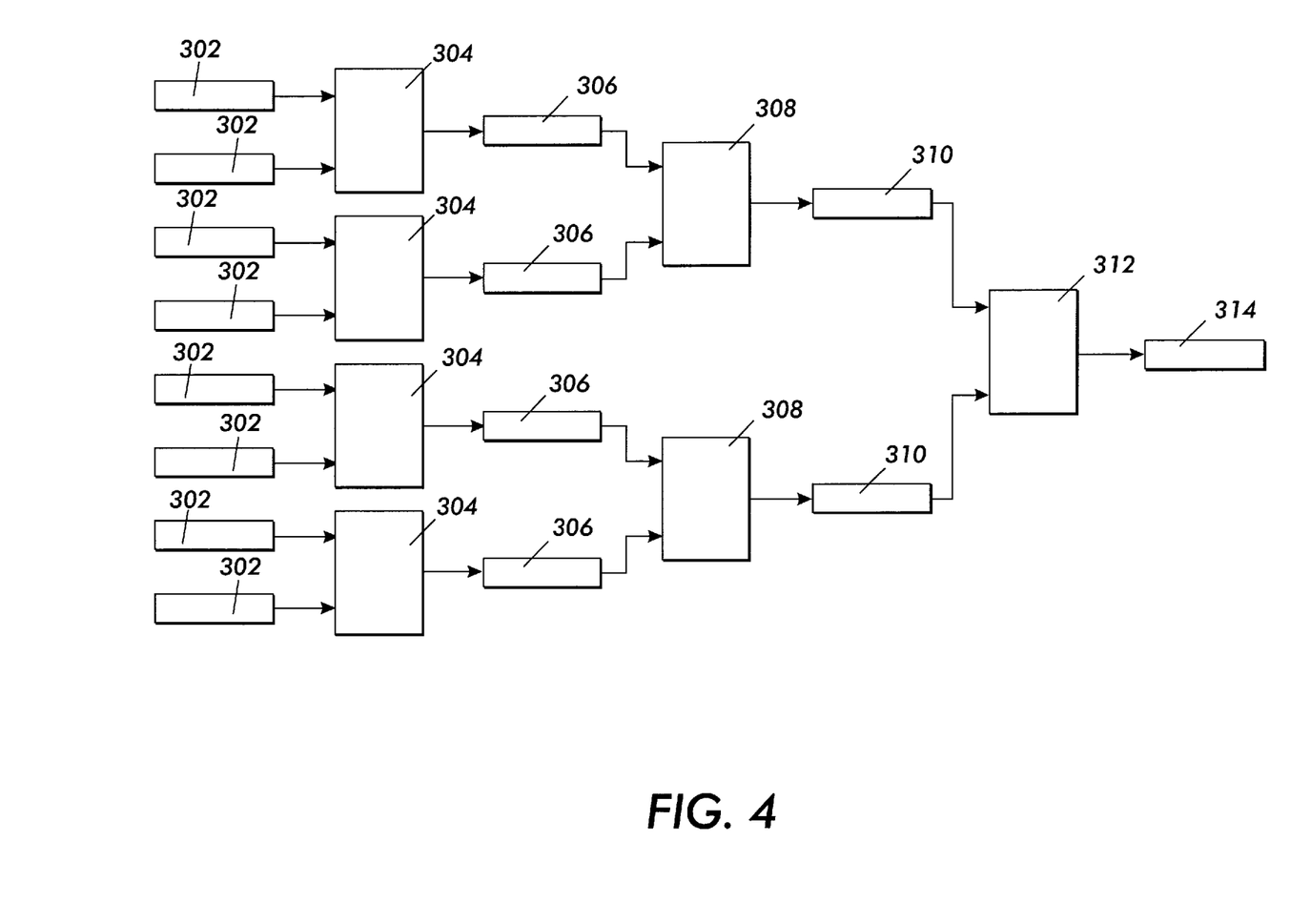
FIG. 4 is a schematic illustration of HVQ which is used in one embodiment of the present invention.
Figure 5:
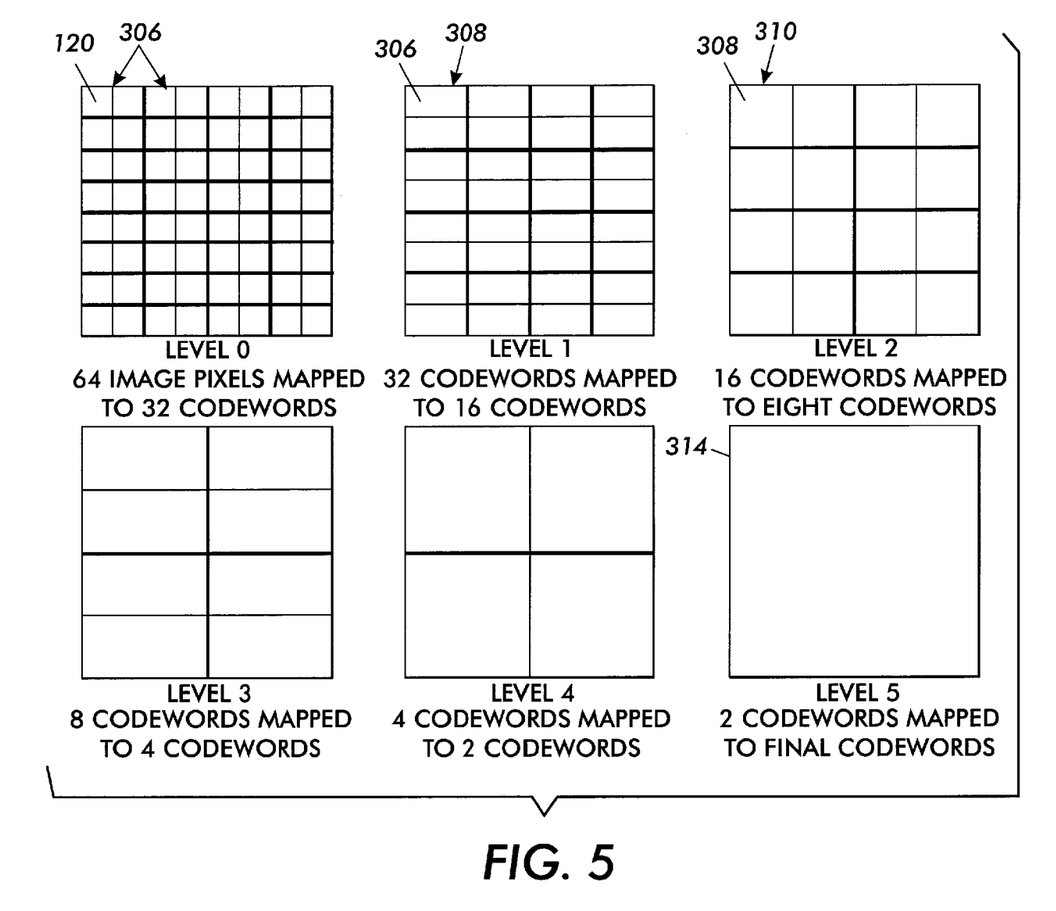
FIG. 5 contains a detailed illustration that shows one embodiment of how input blocks may be mapped to codewords according to the present invention.

Referring now to FIG. 4, a general description of HVQ will now be provided. As indicated earlier, multiple N-bit symbols are mapped to a single B-bit codeword using a series of Look Up Tables (LUTs). As shown in the illustration, two N-bit symbols are mapped to an output codeword 306 at the first level using LUT 304, which has $2^{2N}$ entries. As shown, the total number of inputs is reduced by a factor of two at the each level. The process is repeated until only one output remains, preferably by grouping codewords in a direction perpendicular to that used for the previous level (best indicated in FIG. 5). Repeating the process results in the mapping of larger and larger blocks of data to a single codeword.

HVQ allows for a rough approximation of the content of each input image block using simple look-up table operations. The final codeword represents a block approximation and can, therefore be directly mapped to other quantities which describe certain characteristics of the approximated block, such as block activity. HVQ codebook design methods follow standard VQ codebook design algorithms and are usually performed by designing the codebooks for a single level at a time. Some drawbacks of using VQ in a non-hierarchical manner are that codebook design is often very complex, and that large amounts of time are usually required to search through the codebook and to match inputs to the appropriate codeword. While the present invention allows codebook design to be performed off-line, block matching searches must be performed on-line. Although block matching is somewhat time consuming, transmission of large volumes of data is much faster using the present invention than it would be using standard compression techniques.

HVQ is incorporated into image analyzer 204 to select the codeword that is linked to the data stored in memory 206 which most closely matches that which would result from compressing input block 102. The relationship between input blocks 102 and N-bit inputs is illustrated with reference to FIG. 5, using an 8×8 input block. As shown, pixels 120 in the block are initially grouped in pairs, and each pair is represented by a codeword 306 that references data that appears most similar to that of the input data according to a predetermined distance measure. Visual closeness when viewed with the human eye or some form of statistical analysis of the data contained in the block are two reasonable measurement criteria, but others are possible and the invention is not limited to these embodiments.

Pairs of codewords 306 are then grouped, preferably in the direction perpendicular to that used for the initial grouping, to produce a next level codeword 310. Again, codeword 308 represents image data that will most closely match that contained in input codeword pair 310. Grouping and mapping continues until a single codeword 314 remains. Codeword 310 will represent the data that most closely matches the entire input block 102. (It should be noted here that the numbering final codewords in FIGS. 4 and 5 does not match because fewer levels are shown in FIG. 4 than in FIG. 5. The final output word would be represented by the same reference number if the same number of levels are shown in both drawings.)

Figure 6:
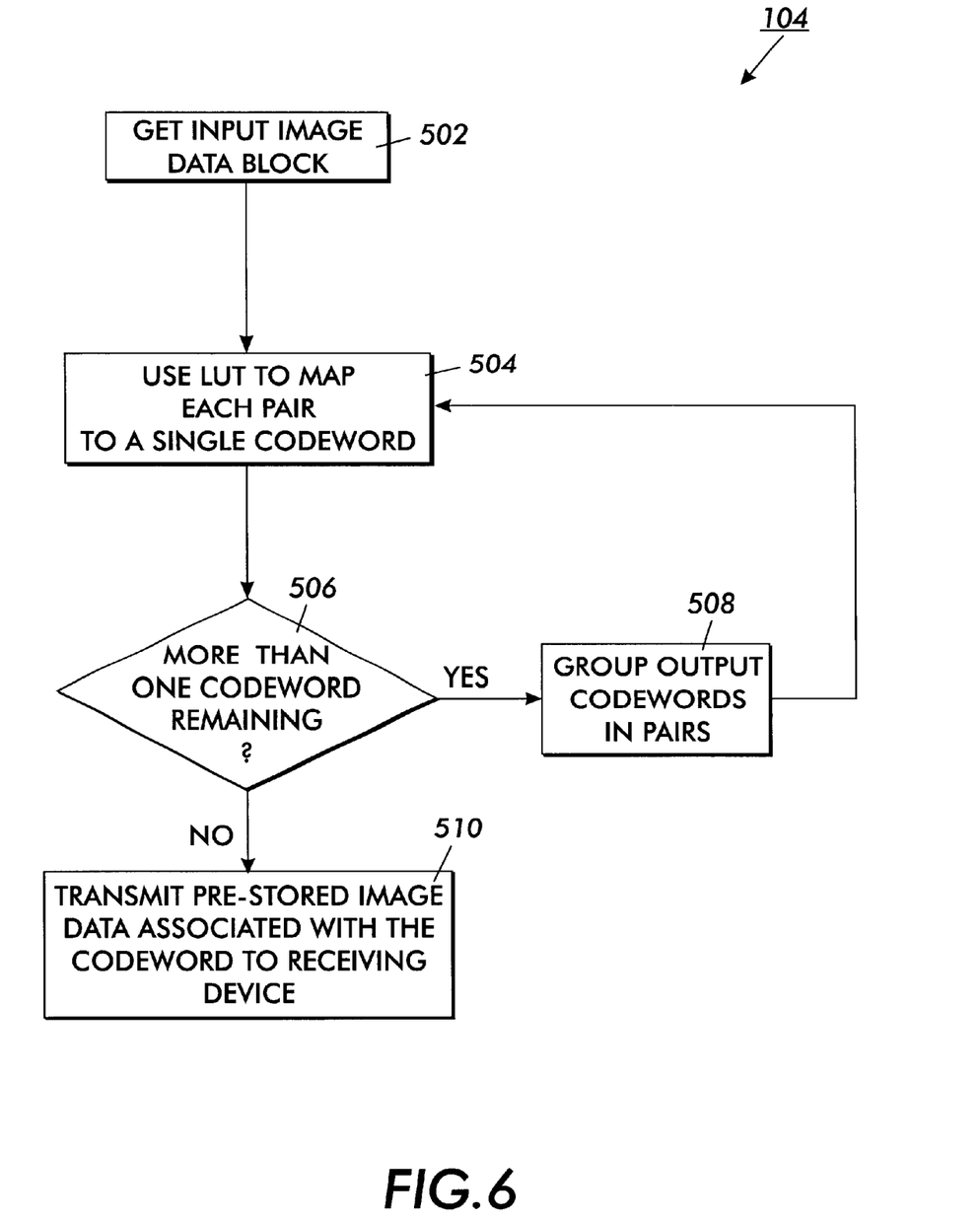
FIG. 6 is a flow chart illustrating generally, the steps performed to analyze input image data according to the present invention.

FIG. 6 contains a flow chart showing the operating details of image analyzer 204. Beginning with step 502 input block 102 is input to image analyzer 204 which, in the preferred embodiment of the invention, is a system based on HVQ. Each pair of N-bit inputs 302 is mapped to a single codeword 306 using a look up table 304 as indicated in step 504.

Grouping the N-bit inputs 302 into pairs and outputting a single codeword 306 therefrom is the preferred embodiment, but use of this configuration is not required to practice the invention. For example, if the shape of the input block or the chosen number of bits, suggests that grouping three or more N-bit inputs 302 would be desirable, the invention could be adapted to accommodate this requirement. Further, if outputting multiple codewords 306 when more than two inputs 302 have been grouped is somehow advantageous, the invention could be adapted to perform this task as well. What is necessary to fully benefit from the present invention is for the number of inputs 302 to exceed the number of codewords 306. Thus, while mapping five N-bit inputs 302 to three N-bit codewords 306 would be desirable, mapping three N-bit inputs 302 to five N-bit codewords 306 would not typically be the best approach.

Assuming that more than one codeword 306 has been generated by the initial level division of input block 102, the codewords produced in the first level must be grouped in pairs and a second LUT 308 must be used to map each pair of resulting codewords 306 to a second level codeword 310. This second mapping reduces the number of codewords 310 by a factor of two over the number of codewords 306 from the previous level. The mapping pairs of codewords to a single codeword in the next level continues in hierarchical fashion until all N-bit inputs that make up input block 102 can be mapped to a single codeword at the last level. That is, LUT levels must continue to be applied hierarchically to each pair of output codewords from the previous level until a single output codeword 314 is generated.

Still referring to FIG. 6, this continued mapping is shown by the loop between steps 504, 506 and 508. It should be noted that a different LUT is used for mapping at each HVQ level, and that the LUTs at all levels above the first have been designed such that the inputs are codewords, rather than image data. The output from these higher level LUTs are codewords which represent the input codewords. Once the number of output codewords has been reduced to one, that final codeword 302 is used to select an output block 302 that consists of data that will closely match that which would have been produced by data compression. Output block 202 will be transmitted in a bit stream over communication lines, most commonly telephone lines, to the appropriate compatible device at the receiving location, and outputting the digital image data at an output device 26 (i.e. fax, computer terminal, video display, printer).

Figure 7:
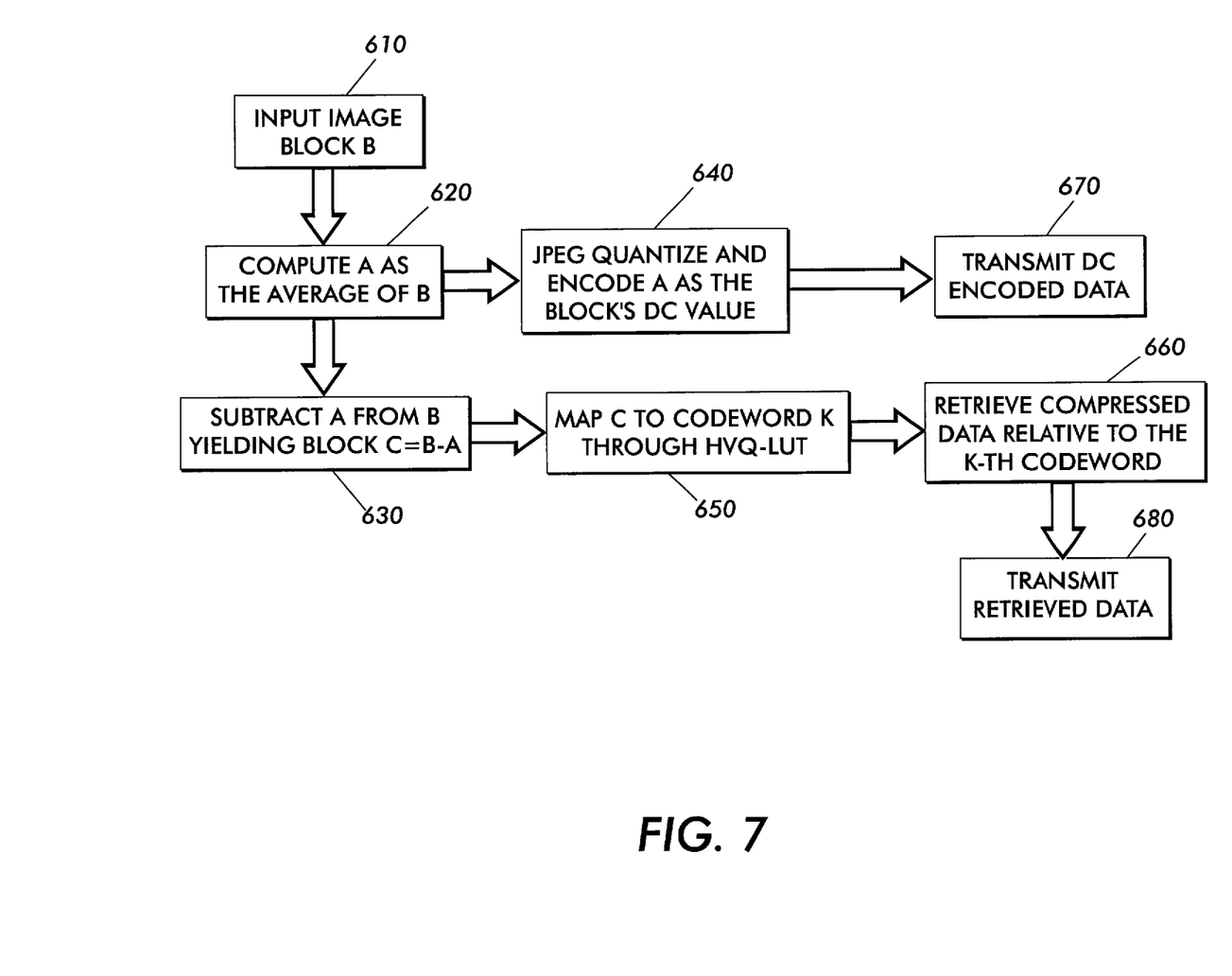
FIG. 7 is an illustration of the preferred embodiment of the invention which includes an implementation that simulates JPEG compression.

In the preferred embodiment of the invention HVQ is incorporated to simulate JPEG compression. Specifically, the data associated with the codeword that is retrieved and transmitted is a representation of the ACC of a block. Turning to FIG. 7, receiving unit 710 retrieves an input block 102 from the input image and computes its average "A" at 620. The pixels in input data block are subtracted by A at 630 to obtain a new zero-mean block "C" wherein C=B−A. The average of zero-mean block C is used as the DCC for the compression of the block, which is then submitted at 640 to quantization, DPCM, and encoding according to the teachings of the JPEG standard, well known in the art. The encoded compressed data (relative to the DCC) is then transmitted in 670 to a receiving device. In this embodiment of the invention, A represents the DCC of input data block 102, while block C corresponds to its ACC.

Block C is submitted to an analysis through LUT-mapping 650 as previously described being mapped to a codeword index K. In the preferred embodiment, the mapping is performed according to the HVQ method of pairing codewords hierarchically in a block, but the invention is not restricted to this form. The retrieved index is used to address the precomputed JPEG compressed data relative to the ACC of the approximating block. This data is retrieved in 660 and output in 680 to complete the process of compressing the ACCs and the DCC of a block. While the DCC is compressed in a regular manner, the data relative to the ACCs is estimated from the input data through a fast analysis process, without resorting to perform the conventional steps for JPEG compression.

It is, therefore, apparent that there has been provided in accordance with the present invention, a method and apparatus for fast compression of JPEG files that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of improving the speed and efficiency of electronic data compression, comprising:

a) obtaining an input image data block which includes discrete values that represent light intensity in an image;

b) analyzing a content of said input image data block and mapping said image data block to a single codeword using at least one look up table by:

1) dividing said input data block into a plurality of samples;

2) grouping said samples in pairs and representing each sample pair with one codeword using a look up table; and 3) linking each pair of said codewords to a next level codeword in hierarchical fashion using a look up table at each level until said image data block may be represented by a single codeword;

c) retrieving stored output image data that will closely match that which would be produced by compressing said input image data; and d) transmitting said retrieved output data to a receiving device.

2. A method of improving the speed and efficiency of electronic data transmission as claimed in claim 1 wherein said analyzing step is performed using hierarchical vector quantization.

3. A method of improving the speed and efficiency of electronic data transmission as claimed in claim 1 wherein for said retrieving step, said stored data simulates an AC coefficient that would be produced by performing JPEG compression on said input image data block.

4. A method of improving the speed and efficiency of electronic data compression as claimed in claim 3 wherein said stored data has been provided by a method comprising the steps of:
   a) computing an average of all signal values in said input block;
   b) subtracting said signal average value from said input block signal values to obtain a zero-mean block having zero-mean signal values;
   c) calculating an average of said zero-mean signal values, and submitting said zero-mean signal average to a quantization step, a DPCM step, and an encoding step according to the teachings of the JPEG standard; and
   d) transmitting said encoded compressed data to a receiving device.

5. A method of improving the speed and efficiency of electronic data compression as claimed in claim 4 further comprising:
   a) mapping said zero-mean block to a codeword using a look up table;
   b) using said codeword to address said stored data; and
   c) retrieving said stored data and outputting said retrieved data to a receiving device.

6. A method of improving the speed and efficiency of electronic data compression, which includes:
   a) obtaining an input image data block which includes discrete values that represent light intensity in an image;
   b) computing an average signal value for said data block;
   c) forming a difference block with signal values that equal a difference between signal values of said input data block and said computed average signal value;
   d) analyzing a content of said difference block and mapping said difference block to a single codeword using at least one look up table;
   e) retrieving stored output image data that will closely match that which would be produced by compressing said difference data block;
   f) encoding said computed average signal value; and
   g) transmitting said encoded computed average signal value and said retrieved output data to a receiving device.

7. An apparatus for transmitting a reproduction of an original image from a sending location to a receiving location, comprising:
   a) a scanner which acquires the original image and which digitizes light that is reflected from said original image to form input digital image data that includes pixel values which represent the light intensity throughout the original image;
   b) a central processing unit which includes a segmenter which separates said input data into a plurality of input data blocks;
   c) an image analyzer which analyzes the content of an input data block, and maps said input data block to a single codeword, the image analyzer having:
      1) a divider which divides said input data block into a plurality of samples,
      2) a binder which groups said samples in pairs and represents each sample pair with a single codeword using a look up table, and
      3) a codeword mapping device which links pairs of said codewords to a next level codeword in hierarchical fashion using a look up table at each level until said image data block may be represented by a single codeword;
   d) a memory with output data blocks stored therein;
   e) a retriever which selects an output data block based upon said input image data block content, and transfers said output data block from a memory to said central processing unit; and
   f) a transmitter which sends said retrieved output data block to a receiving device.

8. An apparatus for transmitting a reproduction of an original as claimed in claim 7 wherein said output data blocks stored in said memory simulate AC coefficients that would be produced by performing JPEG compression on said input data block.

9. An apparatus for transmitting a reproduction of an original image as claimed in claim 7 wherein said retriever further comprises:
   a) a comparer which compares said codeword to said output data blocks until an output data block that closely matches data associated with said codeword is identified; and
   b) a shift register which fetches said output data block from said memory and places in central processing unit.

10. An apparatus for transmitting a reproduction of an original image as claimed in claim 7 wherein said transmitter further comprises a modem.

11. An apparatus for transmitting a reproduction of an original image as claimed in claim 7 wherein said receiving device further comprises a facsimile machine.

12. An apparatus for transmitting a reproduction of an original image as claimed in claim 7 wherein said receiving device further comprises a video monitor.

13. An apparatus for transmitting a reproduction of an original image as claimed in claim 7 wherein said receiving device further comprises a computer memory.

14. An apparatus for improving the speed and efficiency of electronic data compression, comprising:
   a. means for obtaining an input image data block which includes discrete values that represent light intensity in an image;
   b. means for analyzing a content of said input image data block and mapping said image data block to a single codeword using at lest one look up table, said analyzing means including:
      1) means for dividing said input data block into a plurality of samples;
      2) means for grouping said samples in pairs and representing each sample pair with one codeword using a look up table; and
      3) means for linking each pair of said codewords to a next level codeword in hierarchical fashion using a look up table at each level until said image data block may be represented by a single codeword;

c. means for retrieving stored output image data that will closely match that which would be produced by compressing said input image data; and d. means for transmitting said retrieved output data over telephone lines to a receiving device.

15. An apparatus for improving the speed and efficiency of electronic data transmission as claimed in claim 14 wherein said a stored output image data providing means comprises:

a) means for computing an average of all signal values in said input block;

b) means for subtracting said signal average value from said input block signal values to obtain a zero-mean block having zero-mean signal values;

c) means for calculating an average of said zero-mean signal values, and means for submitting said zero-mean signal average to a quantization step, a DPCM step, and an encoding step according to the teachings of the JPEG standard; and d) means for transmitting said encoded compressed data to a receiving device.

16. An apparatus for improving the speed and efficiency of electronic data transmission as claimed in claim 15 wherein said stored output image data providing means further comprises:

a) means for mapping said zero-mean block to a codeword using a look up table;

b) means for using said codeword to address said stored data; and c) means for retrieving said stored data and outputting said retrieved data to a receiving device.

17. An apparatus for transmitting a reproduction of an image as claimed in claim 14 wherein said receiving device is a facsimile machine.

* * * * *